United States Patent
Grilli (10) Patent No.: US 10,805,327 B1
(45) Date of Patent: Oct. 13, 2020

(54) SPATIAL COSINE SIMILARITY BASED ANOMALY DETECTION

(71) Applicant: Amazon Technologies, Inc., Seattle, WA (US)

(72) Inventor: Gianluca Grilli, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 400 days.

(21) Appl. No.: 15/827,810

(22) Filed: Nov. 30, 2017

(51) Int. Cl.
| | |
|---|---|
| *H04L 29/06* | (2006.01) |
| *G06N 20/00* | (2019.01) |
| *G06F 16/35* | (2019.01) |
| *G06F 40/205* | (2020.01) |
| *G06F 40/242* | (2020.01) |
| *G06F 40/284* | (2020.01) |

(52) U.S. Cl.
CPC .......... *H04L 63/1425* (2013.01); *G06F 16/35* (2019.01); *G06F 40/205* (2020.01); *G06F 40/242* (2020.01); *G06F 40/284* (2020.01); *G06N 20/00* (2019.01)

(58) Field of Classification Search
CPC . H04L 63/1416; H04L 63/1425; G06F 16/35; G06F 40/284; G06F 40/205; G06F 40/242; G06N 20/00
See application file for complete search history.

(56) References Cited

U.S. PATENT DOCUMENTS

| | | | | |
|---|---|---|---|---|
| 5,867,799 | A | * | 2/1999 | Lang ...................... G06F 16/337 |
| 7,155,668 | B2 | * | 12/2006 | Holland .................. G06F 40/20 |
| | | | | 715/256 |
| 2014/0181968 | A1 | * | 6/2014 | Ge ...................... H04L 63/1416 |
| | | | | 726/23 |

OTHER PUBLICATIONS

Choi, S.-S., "Correlation Analysis of Binary Similarity and Dissimilarity Measures," Doctoral Dissertation, Pace University, Jan. 1, 2008, 2 pages [Abstract Only].
Crocetti, G., "Textual Spatial Cosine Similarity," Proceedings of Student-Faculty Research Day, CSIS, Pace University, May 2, 2014, 4 pages.
Gerhards, R., "The Syslog Protocol," RFC 5424, Network Working Group, Internet Engineering Task Force [https://tools.ietf.org/html/rfc5424], Mar. 2009, 39 pages.
Hassan, S., "Measuring Semantic Relatedness Using Salient Encyclopedic Concepts," Doctoral Dissertation, University of North Texas, 2011, 110 pages.
Huang, A., "Similarity Measures of Text Document Clustering," Proceedings of the Sixth New Zealand Computer Science Research Student Conference (NZCSRSC 2008), Christchurch, New Zealand, 2010, pp. 49-56.

(Continued)

*Primary Examiner* — Paul E Callahan
(74) *Attorney, Agent, or Firm* — Davis Wright Tremaine LLP (57) ABSTRACT

An anomaly detection system is provided that obtains messages, log entries, or other information from computing resources in a distributed computing system. The messages may be compared to virtual messages generated during a training phase. The messages and the virtual messages may be compared using a spatial cosine similarity algorithm. A message may then be classified (e.g., as anomalous or not) based at least in part on the spatial cosine similarity between the message and the virtual message.

20 Claims, 7 Drawing Sheets

(56) References Cited

OTHER PUBLICATIONS

Jiang, J.J., et al., "Semantic Similarity Based on Corpus Statistics and Lexical Taxonomy," Proceedings of the International Conference on Research in Computational Linguistics (ROCLING X), Taipei, Aug. 1997, pp. 19-33.

Kimura, T., et al., "Network Failure Detection and Diagnosis by Analyzing Syslog and SNS Data: Applying Big Data Analysis to Network Operations," NTT Technical Review, vol. 11(11), Nov. 2013, 6 pages.

Liu, N., et al., "Learning Similarity Measures in Non-orthogonal Space," Proceedings of the Thirteenth ACM International Conference on Information and Knowledge Management (CIKM '04), Washington, D.C., Nov. 8-13, 2004, pp. 334-341.

Lonvick, C., "The BSD Syslog Protocol," RFC 3164, Network Working Group, Internet Engineering Task Force [https://tools.ietf.org/html/rfc3164], Aug. 2001, 30 pages.

Mihalcea, R., "CSCE 5290—Natural Language Processing," University of North Texas, 2011, 72 pages.

Potharaju, P, et al., "Juggling the Jigsaw: Towards Automated Problem Inference from Network Trouble Tickets," 10th USENIX Symposium on Networked Systems Design and Implementation (NSDI '13), 2013, pp. 127-141.

Vaarandi, R., "A Data Clustering Algorithm for Mining Patterns From Event Logs," 3rd IEEE Workshop on IP Operations and Management, 2003 (IPOM 2003), Oct. 3, 2003, pp. 119-126.

Zhang, J., "Visualization of Information Retrieval," The Information Retrieval Series (Book 23), Springer 2008, pp. 27-34 and 138-139.

\* cited by examiner

SPATIAL COSINE SIMILARITY BASED ANOMALY DETECTION

BACKGROUND

Network monitoring for interconnected computer systems is becoming increasingly difficult and complex. In large enterprise networks with many devices, each with multiple interfaces and associated interactions with interfaces of other devices, the number of system events collectively logged can quickly become very large per unit time. As a result, it may be prohibitive for administrators of such networks to manually, or even automatically, inspect and/or process the logs in a way that effectively allows filters to identify impactful messages and/or differentiate messages having different levels of importance. These difficulties carry important implications for network administration and network security.

BRIEF DESCRIPTION OF THE DRAWINGS

Various techniques will be described with reference to the drawings, in which.

DETAILED DESCRIPTION

The present document describes a system that provides improved detection of system anomalies, such as in large computer networks, by performing spatial cosine similarity analysis on log entries, system alerts, report entries, and other diagnostic information obtained from various systems in the network. A computing resource service provider provides an anomaly detection service that obtains log information from a plurality of computing resources within a computing environment. The computing resource environment may include client computer systems, virtualized computing resources, computer servers, data storage resources, authentication resources, encryption resources, network devices and appliances, or other computing resources operated by a computing resource service provider. These computing resources, in various examples described in greater detail below, generate messages and/or entries in system logs in response to various events detected by these computing resources and/or operations performed by these computing resources. These messages and/or entries in system logs may be used for a variety of purposes such as system management, security auditing, analysis, debugging, and generally providing information about the operation of the computer resource.

In general, detecting anomalies in such messages can be difficult due to the number of messages, size and complexity of computing environments, making analysis computationally complex and difficult to perform at scale. As described in the present disclosure, the anomaly detection system provides a technical advantage by providing improved mechanisms to detect anomalies by at least measuring the similarity between messages and a virtual message. In one example, the virtual message is generated during a training phase and is representative of a majority or other percentage of messages observed by the anomaly detection service over an interval or time. During a detection phase the anomaly detection service may compare messages to the virtual message using a spatial cosine similarity algorithm described in greater detail below. In an example, the result of the spatial cosine similarity algorithm indicates an amount of similarity between the message and the virtual message. The anomaly detection server may then categorize or otherwise indicate classification of the message. In various examples, messages are filtered, parsed, and tokenized, as described in greater detail below, to generate vectors or other data formats that are suitable for analysis using the spatial cosine similarity algorithm.

As described in greater detail below, if the result of the spatial cosine similarity algorithm is within a value relative to a threshold, the message may be classified as "known but still rare" or another classification indicating that the message includes information that has previously been analyzed by the anomaly detection service but is uncommon relative to other messages. Alternatively, the result of the spatial cosine similarity algorithm may indicate that the message is common and may be disregarded by the system. In one example, the anomaly detection service maintains a global dictionary of tokens included in messages and frequencies associated with the tokens. This information may be used to generate the virtual messages and determine the classification of messages. For example, as described in greater detail below, the virtual messages may be generated based at least in part on the global dictionary. During the detection phase, if one or more tokens included in the message are not in the global dictionary, the message may be categorized as a "new message" and the global dictionary may be updated. Furthermore, the train phase may be rerun and a new and/or updated global dictionary and/or virtual message is generated. In addition, the classified messages may be provided to various end points such as a system engineer or a machine learning algorithm. In one example, the classified messages are used to generate regular expressions that can be used to identify (e.g., filter or catch) messages of interest (e.g., having certain attributes, such as a level of rarity, severity, or importance) generated by computing resources as described above.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
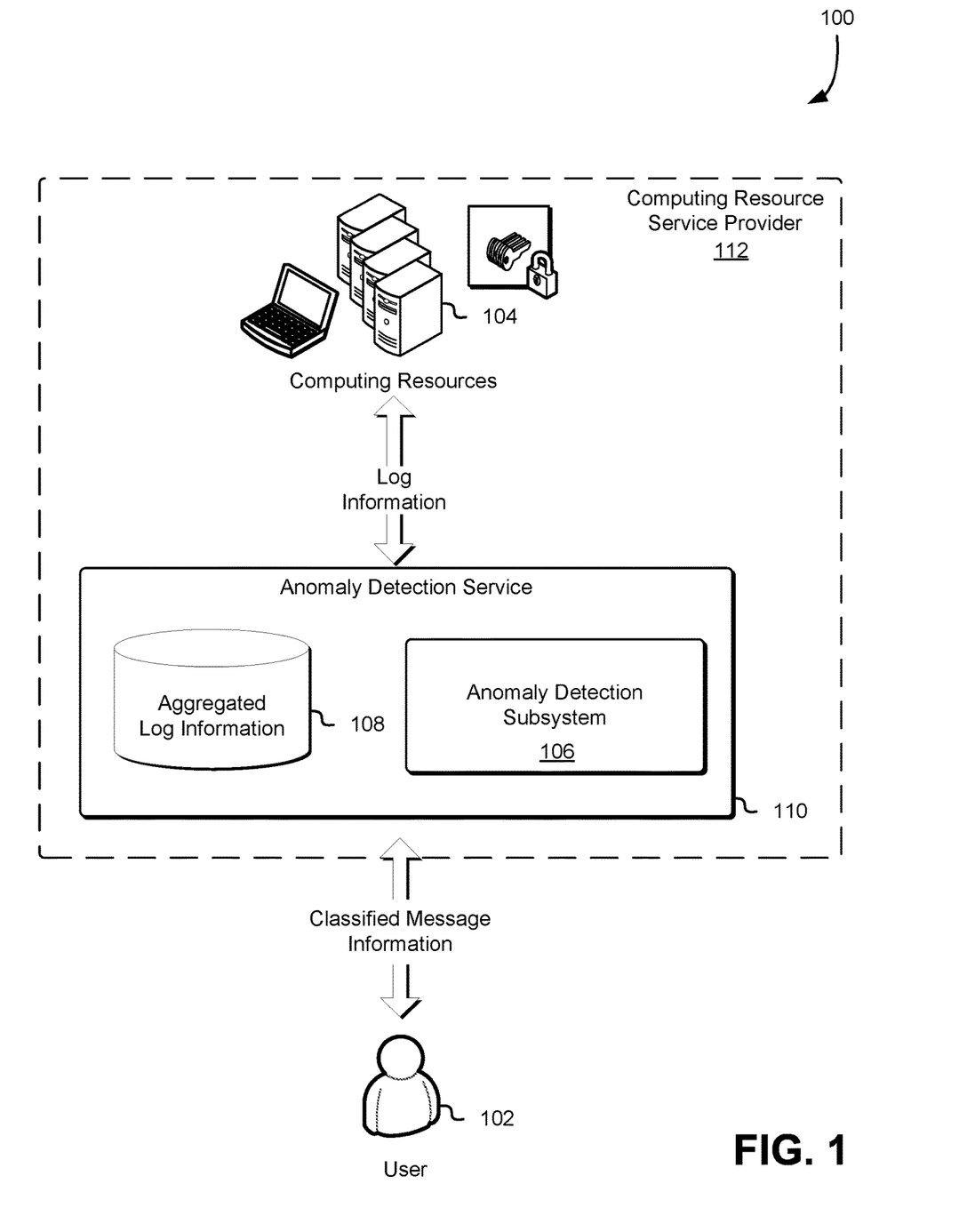
FIG. 1 illustrates an environment in which an anomaly detection service determines classifications for messages included in log information obtained from computing resources in accordance with an embodiment.

FIG. 1 illustrates an environment 100 in which an anomaly detection service 110 includes an anomaly detection subsystem 106 that determines a classification for messages and other information obtained from log information generated by computing resources 104 in accordance with an embodiment. In various embodiments, a computing resource service provider 112 provides computing resources to users 102 and other entities. Furthermore, the users 102 may use the classified message information to generate regular expressions of other information that may be used by the anomaly detection service 110 or other systems to detect anomalous activity. The anomaly detection service 110 and anomaly detection subsystem 106, in various embodiments, include software, logic, or other executable code that, when executed by computing resources of the computing resource service provider 112, provide the user 102 with classified message information as described in greater detail below. Furthermore, the anomaly detection subsystem 106, as illustrated in FIG. 1, may be a component of the anomaly detection service 110 implemented by server computer systems in a data center operated by the computing resource service provider 112. In various embodiments, the anomaly detection service 110 is implemented as a standalone system including dedicated hardware that can be connected to computing resources of the computing resource service provider 112.

The computing resources 104 provided by the computing resource service provider 112 may be used by customers of the computing resource service provider 112 to perform computational tasks and storage operations, execute applications, or generally leverage the computing resource. As described in greater detail below, the computing resources 104 provided by the computing resource service provider 112 may include processing units, storage devices, network appliances, or other devices to support the executing of customer applications and/or tasks. Furthermore, the computing resources 104, including computing resources utilized to implement the various components illustrated in FIG. 1, may include virtualized computing resources such as virtual machines, virtual storage devices, or any other computing resources capable of being virtualized.

The computing resources 104 include any computing resources used to execute an application or perform a task such as server computer systems, routers, switches, network devices, storage device, or other computing devices capable of executing an application or performing a task. Furthermore, the computing resources 104 may include computing resources provided by the computing resource service provider 112. In one example, a portion of the computing resources 104 is provided by the customer in an on-premises data center (e.g., a data center operated by the customer) and another portion of the computing resources 104 are provided by the computing resource service 112. For the purposes of the present disclosure, the computing resources 104 may include computing resources entirely provided by the computing resource service provider 112 or the customer. In embodiments, where the resources 104 are provided by a third party (e.g., the customer), the third party provides the anomaly detection service 110 with access to log information generated by the computing resource 104. In one example, the third party executes an agent or other component of the anomaly detection service 110 responsible for transmitting log information to the anomaly detection service 110.

In various embodiments, the anomaly detection service 110 includes a front-end server (not illustrated in FIG. 1 for simplicity), which obtains log information from a variety of different sources, including computing resources 104 (e.g., computing resources provided by the computing resources service provider 112 and/or the customer), various other services of the computing resource service provider, and computing resources made available to the customers through the various services. In one example, the log information is obtained from a storage service that provides a customer operated virtual machine with access to a logical volume. In another example, the log information is obtained from a networking service operating network appliances to provide networking functionality to computing resources 104 of the computing resource service provider 112. The log information, as described above, may include log data, messages, entries, or other information indicating operational information and/or system information obtained from the computing resources 104, including information obtained by obtaining various measurements from the computing resources 104. In one example, the log information includes messages obtained from a syslog mounting tool obtained from routers and/or switches included in the computing resources 104. The syslog message format may include message formats as defined in RFC-3164 and RFC-5424 hereby incorporated by reference as if they were set forth in its entirety herein.

The log information obtained by the anomaly detection service 110, in various embodiments, is stored in an aggregated log information data store 108. In one example, the aggregated log information data store 108 is provided by a storage service of the computing resources service provider 112. In another example, the anomaly detection service 110 includes storage resources provided by the computing resource service provider 112. The anomaly detection service 110 may store log information for processing by the anomaly detection subsystem 106. In various other embodiments, the log information is obtained as a stream of data, for example, from a data streaming service. In yet other embodiments, the aggregated log information data store 108 is a repository for maintaining metrics data including time series log information (e.g., data indicating a measurement of the computing resources 104 over an interval of time). The log information data store 108 may be a relational database, non-relation database, key value store, hard disk drive, or other storage device.

As described in greater detail below, the anomaly detection subsystem 106 may use a spatial cosine similarity algorithm to identify and/or classify messages, log entries, or other information included in the log information obtained from the computing resources 104. In various embodiments, a training phase is performed to generate a global dictionary and a virtual message. The global dictionary may include content of the log information such as tokens, characters, words, components of a message and/or entry, or any other information that may be obtained from the log information. In various examples described above messages included in the log information may be filtered based at least in part on a severity indicated in the message. For example, the message format may include a severity range such as "0" for emergency up to "7" for debug as described above in RFC-3164 and RFC-5424. The anomaly detection service 110 or component thereof such as the anomaly detection subsystem 106 may filter messages based at least in part on a severity level associated with the message. In one example, any message obtained from the log information with a severity level of 4 or higher is filtered such that the messages are not used by the anomaly detection service 110 or component thereof, such as the anomaly detection subsystem 106.

As described in greater detail below, the anomaly detection subsystem 106 may execute a detection phase during which messages obtained from the log information are compared to the virtual message using the spatial cosine similarity algorithm. The anomaly detection service 110 may determine a threshold value for the results of comparing messages obtained from the log information to the virtual message using the spatial cosine similarity algorithm based at least in part on an amount of classified message information to be provided to the user 102. Furthermore, in various embodiments, the global dictionary and/or virtual message is updated periodically or aperiodically. In one example, the anomaly detection service 110 determines an updated global dictionary and/or virtual message after a predetermined quantity of messages (e.g., 25,000) have been processed during the detection phase.

Figure 2:
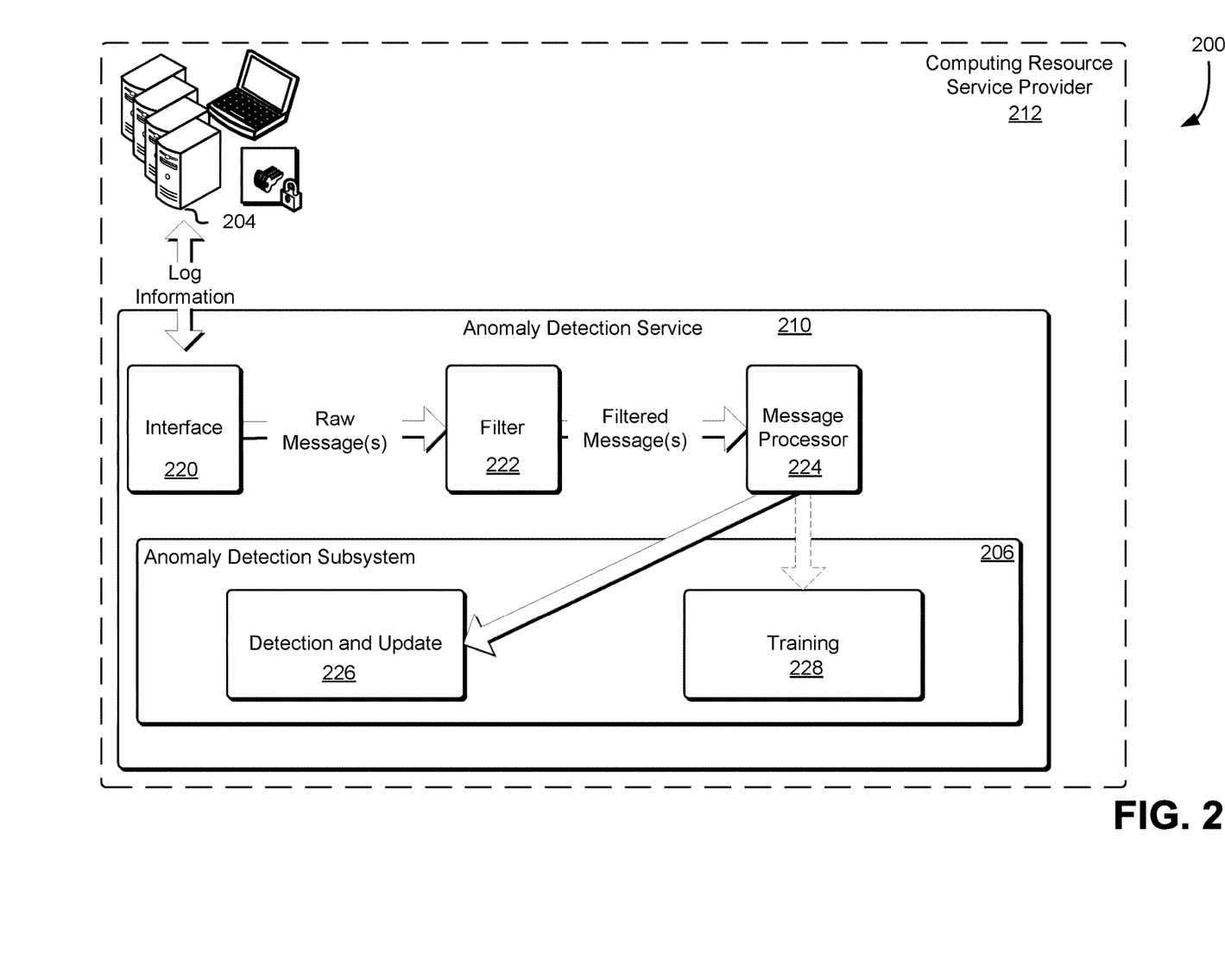
FIG. 2 illustrates an environment in which an anomaly detection service determines classifications for messages included in log information obtained from computing resources in accordance with an embodiment.

FIG. 2 illustrates an environment 200 in which an anomaly detection service 210 includes an anomaly detection subsystem 206 that determines a classification for messages and other information obtained from log information generated by computing resources 204 in accordance with an embodiment. As described above, the computing resources 204 may include a variety of different computing devices that may generate message, log entries, or other information that may be analyzed by the anomaly detection service to detect anomalous activity. In various embodiments, anomalous activity includes hardware errors, software errors, network attacks (e.g., address spoofing, DNS spoofing, data exfiltration attacks, sabotage, phishing, denial of service attacks, etc.), or any other operation of the computing resources 204 that may be deemed anomalous.

Furthermore, as illustrated in FIG. 2, the anomaly detection service 210 includes an interface 220. The interface may be a front-end server or other computer system, as described above, responsible for distributing traffic to and from the anomaly detection service 210 as well as distributing traffic within the anomaly detection service 210. In one example, the interface 220 obtains log information (e.g., messages generated by the computing resources 204) and provides the log information to a filter 222. As described in greater detail below, the filter 222 may reduce a number of messages provided to the anomaly detection subsystem 206. The filtered messages, in various embodiments, are then provided to a message processor 224 for processing. Processing the messages may include a variety of operations described in greater detail below. For example, processing the messages may include removing time stamp information, parsing the message, tokenizing the message, or otherwise preparing the message for use by the anomaly detection subsystem 206. Furthermore, the anomaly detection subsystem may include a training phase 228 and a detection and update phase 226.

In various embodiments, the interface 220, filter 222, message processor 224, and anomaly detection subsystem 206 are implemented by physical computing resources (e.g., server computer system, dedicated hardware, etc.), virtualized computing resources, or a combination thereof. As described in the present disclosure the anomaly detection subsystem 206 may utilize the spatial cosine similarity algorithm to measure the similarity between two or more vectors. The messages obtained from the log information, in various embodiments, are processed by the message processor 224 to generate a vector of the message that may be used in connection with the spatial cosine similarity algorithm.

Given two non-null vectors, $\vec{A}$ and $\vec{B}$ and an angle $\theta$ between vectors $\vec{A}$ and $\vec{B}$, the spatial cosine similarity can be defined as the cosine of the angle between vectors $\vec{A}$ and $\vec{B}$. This value may be equal to the dot product of the vectors divided by the product of the vectors magnitude as defined by the following equation:

$$\cos\theta = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}, n = dim(A) = dim(B)$$

where $A_i$ and $B_i$ are components of the vectors $\vec{A}$ and $\vec{B}$. The result of the equation above ranges from $-1$ to $1$. If the two vectors overlap, the spatial cosine similarity value will be 1. A spatial cosine similarity value of $-1$ indicates that the vectors are directionally opposed. In such embodiments, however, the minimum possible spatial cosine similarity value is 0 because the frequencies of the tokens cannot be negative. Accordingly, a value of 1 means that the two messages have the same tokens while a value of 0 indicates that the two messages have no tokens in common.

As described in the present disclosure, the detection and classification of anomalous activity by the anomaly detection service 210 includes pre-processing and cleaning of messages from the log information, the training phase 228, and the detection and update phase 226. In various embodiments, the interface 220 or other component of the computing resource service provider 212, such as a stream service, collects, parses, and encodes messages obtained from the log information. In one example, the interface 220 encodes the messages in JavaScript Object Notation (JSON) format. Furthermore, the interface 220 may route messages to the appropriate component of the anomaly detection service 210. As described above, the filter 222 may discard messages with a severity level greater than 3. Other mechanisms for reducing the number of messages to be processed are considered within the scope of the present disclosure.

Messages that are not discarded by the filter 222 may be provided to the message processor 224. In various embodiments, the message processor 224 removes English stop words, articles, pronouns, numbers, special characters, or any other information in the message not required by the anomaly detection subsystem 206. In various embodiments, once the messages are processed by the message processor 224 they may be returned to the interface 220 for distribution. For example, if the anomaly detection subsystem 206 is currently implementing the training phase 228, processed messages may be directed to the training phase 228 component of the anomaly detection subsystem 206 (illustrated in FIG. 2 with a dashed line). Alternatively, if the anomaly detection subsystem 206 is currently implementing the detection and update phase 226, messages may be directed to the detection and update phase 226 component of the anomaly detection subsystem 206. Furthermore, as illustrated in FIG. 2, the message processor 224 may distribute the processed messages directly to the appropriate component of the anomaly detection subsystem 206 without first providing the processed messages to the interface 220. Furthermore, the messages obtained from the log information may be filtered and processed as a pipeline or stream to the anomaly detection subsystem 206.

The anomaly detection subsystem 206, in various embodiments, maintains a global dictionary of all tokens obtained from the messages together with the frequencies of the tokens. The global dictionary may be defined as:

Global Dictionary=$GD=[gd_1, gd_2, \ldots, gd_n]$, $gd_k=<t_k, f_k>$, $k \in [1, \ldots, n]$.

As described in greater detail below, the global dictionary may be used to generate a virtual message, which represents the direction of the messages obtained by the anomaly detection service 210 between successive training phases. The virtual message, in various embodiments, is a subset of the global dictionary and can be defined as:

Virtual Message=$VS=[vs_1, vs_2, \ldots, vs_m]$, $vs_k=<t_k, f_k>$, $k \in [1, \ldots, m]$.

During the training phase 228 the global dictionary is updated. In various embodiments, processed messages are obtained (e.g., tokenized messages), new tokens are stored in the global dictionary, and the frequencies of existing tokens are updated. During the detection and update phase 226, processed messages are obtained and a temporary message vector is generated and compared to the virtual message. The training phase 228 may be executed until the termination of the training phase 228 is triggered, for example, at the expiration of an interval of time or once a certain number of messages are processed. The training phase 228, in various embodiments, results in a number of frequent tokens being determined and used to create the virtual message. During the training phase 228 after a certain amount of messages are used to generate the global dictionary, the global dictionary is sorted and the first m tokens are extracted and used to generate the virtual message. In various embodiments, the value m is determined by the following equation:

$f_m \leq k_1 * \max(f_1), k_1 = 0.05$

The equation may ensure that the last token frequency in the virtual message is at most 0.05 times the highest frequency. Furthermore, the parameter $k_1$ may be modified in various embodiments based at least in part on, and/or in accordance with, the processing capability (e.g., computational capacity, message velocity, etc.) of the various resources of the computing resource service provider 212. The training phase 228, in various embodiments, is completed after a certain number of messages (e.g., 25,000 messages, 50,000 messages, etc.) are processed. Once the virtual message is generated the training phase 228, it may be considered completed. However, as described above, the training phase 228 may be repeated after a certain number of messages are processed during the detection and update phase 226. In various embodiments, the frequencies included in the global dictionary may be halved prior to generating the virtual message. This may ensure that, if not obtained anymore, a particular token with frequency a will be zero in S step, where S is defined by the following equation:

$S(\alpha) = [\log_2(\alpha)] + 1$

During the detection and update phase 226, messages obtained from the log information are processed by the filter 222 and message processors 224 as described above, and messages are tokenized and temporary messages are created. The virtual message and the temporary message are defined by as followed:

Virtual Message=$VS=[vs_1, vs_2, \ldots, vs_m]$, $vs_k=<t_k, f_k>$, $k \in [1, \ldots, m]$ Temporary Message=$MV=[mv_1, mv_2, \ldots, mv_m]$, $mv_k=<t_k, f_k>$, $k \in [1, \ldots, m]$ $\dim(MV) \equiv \dim(VS) << \dim(GD)$, $VS \subseteq GD$ In various embodiments, the temporary message and the virtual message have the same dimensions and the temporary message components represent the frequencies of the message tokens. In one example, a particular message $M_i$ with the following tokens: {a, d, d}, if VS=[<a, $f_a$>, <b, $f_b$>, <c, $f_c$>, <d, $f_d$>, <e, $f_e$>], then the temporary message $MV_i$=[<a,1>, <b, 0>, <c, 0>, <d, 2>, <e, 0>]. In various embodiments, once the temporary message is created (e.g., $MV_1$) the spatial cosine similarity between the temporary message and the virtual message is calculated. The value of the spatial cosine similarity between the temporary message and the virtual message, as described in greater detail below, may be used to label, indicate, or otherwise classify the message from which the temporary message was created anomalous during the detection and update phase 226.

In one example, during the detection and update phase 226, the temporary message may be evaluated to determine a number of new tokens in the message. New tokens include any token not included in the global dictionary. If the number of new tokens is greater than zero, the message may be classified as "unseen." As described in the present disclosure, classified messages may be provided to an endpoint for processing. In one example, a regular expression is generated based at least in part on the message and used to detect further anomalous activity. In addition, if the spatial cosine similarity value is within a value relative to a threshold, the anomaly detection subsystem 206 may classify the message as "rare."

In various embodiments, messages classified as rare or unseen are provided to the user or other endpoint as described above. The detection logic implemented during the detection and update phase 226 can be defined by the following equation:

anomalous message ⇒!matched by $DD \land$ (prioritiy>$0 \lor SCS \leq k_3$)

where DD represents an existing generic regular expression or other pattern matching mechanism used to detect anomalous messages, priority represents the number of new tokens detected in the temporary message, SCS represents the spatial cosine similarity, and $k_3$ represents a threshold value as described above. The value $k_3$, in various embodiments, is set based at least in part on a number of anomalous messages to be detected by the anomaly detection subsystem 206. For example, if more anomalous messages are to be detected the higher the value of $k_3$ may be set. Furthermore, the value $k_3$ may be modified during operation of the anomaly detection subsystem 206. The value $k_3$ may be determined and/or selected deterministically, experimentally, manually, and/or through a partly or full automated process. For example, an initial value for $k_3$ may be set using simulation and/or regression techniques, such as by using the following equation:

$$y = f(x \mid \sigma) = \frac{1}{x\sigma\sqrt{2\pi}} e^{\frac{-(\ln(x) - u)^2}{2\sigma^2}}, \mu = 0.0, \sigma = 1.0$$

The equation above may provide the lognormal distribution to simulate the frequency distribution of the tokens of the virtual message. From this initial value, a set of trials may be executed to further tune the value for $k_3$ according to a desired detection "sensitivity" for anomalous messages. In such embodiments, each trial may compare virtual messages using the spatial cosine similarity and a fourth degree polynomial may be used for both curve fitting and identifying $k_3$ as defined by the following equation:

$$\gamma=\beta_0+\beta_1 x+\beta_2 x^2+\beta_3 x^3+\beta_4 x^4+\epsilon, \gamma=p$$

The threshold $k_3$ may be set to the maximum real solution to the above equation. In various embodiments, the maximum real solution to the above equation is limited to a specific range (e.g., 0.001 to 0.008).

Figure 3:
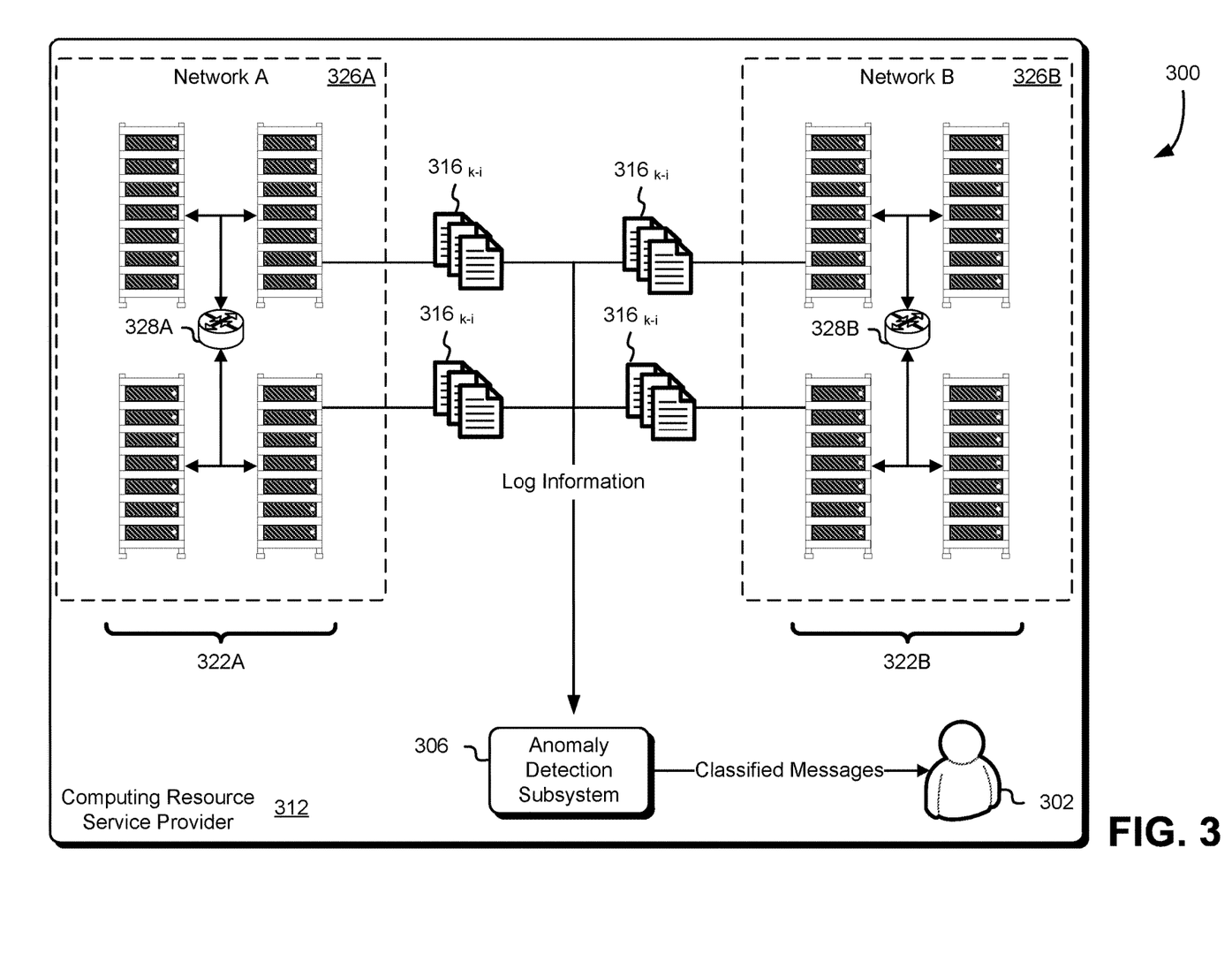
FIG. 3 illustrates an environment in which an anomaly detection service determines classifications for messages included in log information obtained from computing resources in accordance with an embodiment.

FIG. 3 illustrates an aspect of a system 300 in which an embodiment may be practiced. Specifically, FIG. 3 depicts an anomaly detection subsystem 306 obtaining log information 316 from computing resources within the servers in sets of racks 322A-322B to be used to detect anomalous activity of the computing resources within the servers in sets of racks 322A-322B. The system 300 includes the anomaly detection subsystem 306 of a computing resource service provider 312, as described above, that classifies messages, log entries, or other information generated by the server computer systems or other components of the sets of racks 322A-322B. The log information $316_{k-i}$ obtained from different server computer systems in the sets of racks 322A-322B may include messages or any other information generated by the server computer systems as described above. In one example, the messages include syslog messages generated by network devices included in the sets of racks 322A-322B. In another example, the log information $316_{k-i}$ includes any information that may be converted into a vector and used in connection with the spatial cosine similarity algorithm as described above. For example, the log information $316_{k-i}$ may include e-mails, text messages, documents, or other textual content.

As described above, log information $316_{k-i}$ may be filtered, cleaned, tokenized, and/or otherwise modified or formatted for use by the anomaly detection subsystem 306. In one example, the anomaly detection subsystem 306 parses the log information to generate temporary messages that are compared to a virtual message using the spatial cosine similarity algorithm. In various embodiments, the anomaly detection subsystem 306 determines a classification for messages included in the log information $316_{k-i}$ and provides the classified messages to a user 302. As described above, the user 302 may use the classified messages to create and/or modify regular expressions or other information used to detect anomalous activity of the server computer systems. Furthermore, the computing resource service provider 312 may provide additional computing resources and/or services to detect anomalous activity.

The anomaly detection subsystem 306 may be software or executable code executed by the servers in the sets of racks 322A-322B or other computing resources that obtains log information $316_{k-i}$ from the server computer systems in the sets of racks 322A-322B and detects anomalous activity of the server computer systems in the sets of racks 322A-322B as described above in conjunction with FIG. 1. The sets of racks 322A-322B may be physical hardware that hosts one or more server computer systems or, in some embodiments, is simply a logical grouping of the one or more server computer systems. Examples of logical groupings, other than by rack, may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The server computer systems in a rack may be members of a particular network. In some implementations, multiple racks of servers may be members of the same network. For example, as illustrated in FIG. 3, the server computer systems of the set of racks 312A share the network 326A. Likewise, the servers of the set of racks 312B share the network 326B.

The networks 326A-326B may be data communication pathways between one or more electronic devices. The networks 326A-326B may be wired or wireless networks and may use any of a variety of communication protocols for organizing their network traffic. The networks 326A-326B may allow the sharing of files, data, and other types of information between the one or more electronic devices accessible through the data communication pathways. Each of the networks 326A-326B may be associated with a router, such as an aggregation router that aggregates the servers of the respective set of racks into the common network, separate from the router associated with the other network. Each of the networks 326A-326B may be on a different subnet than the other network. For example, as illustrated in FIG. 3, the servers of the set of racks 312A may be commonly connected to a router 328A. Similarly, the servers of the set of racks 312B may be commonly connected to a router 328B. The routers 328A-328B may be networking devices that forward packets between computer networks, such as between the networks 326A-326B.

Figure 4:
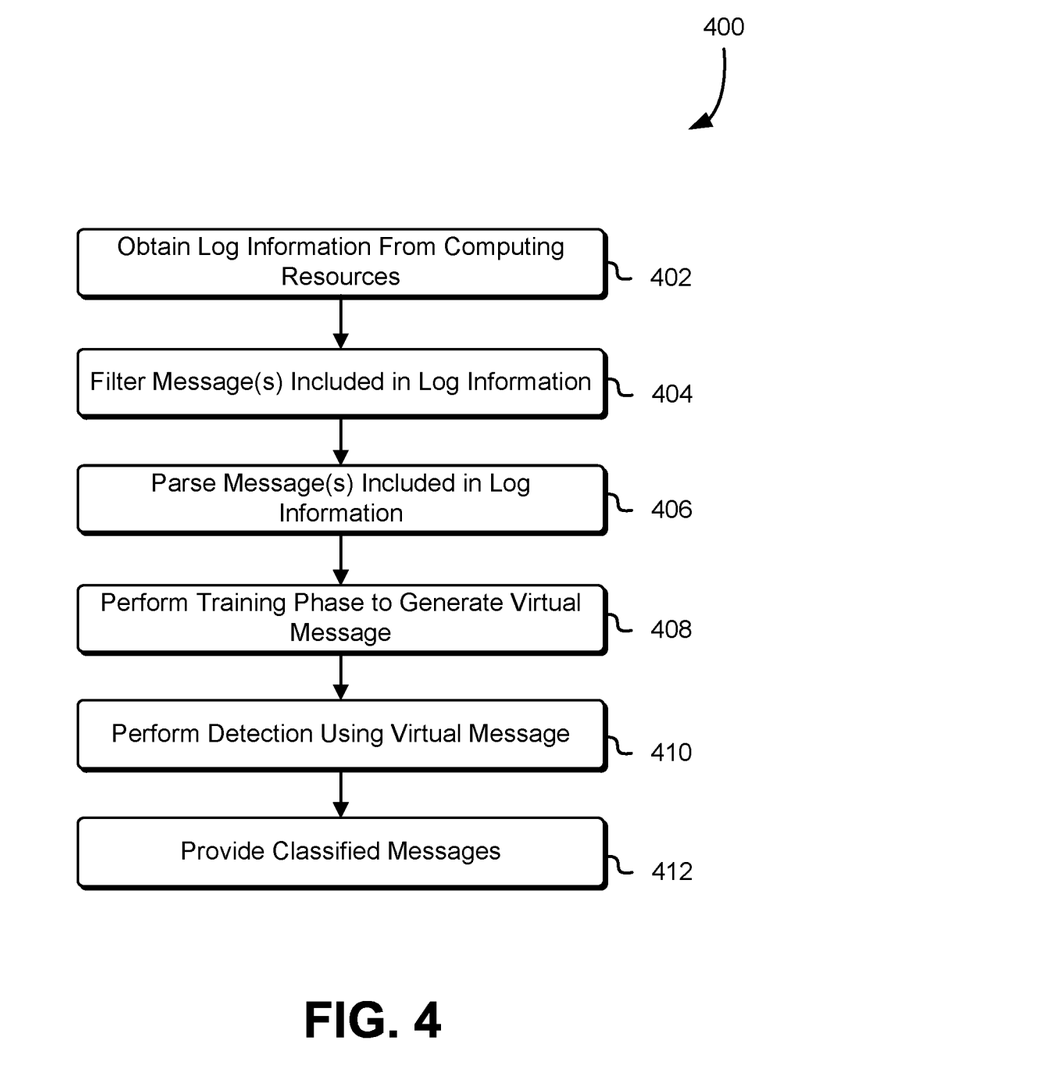
FIG. 4 shows an illustrative process which may be used to determine classifications for messages included in log information obtained from computing resources in accordance with an embodiment.

FIG. 4 is a block diagram illustrating an example of a process 400 for providing classified messages in accordance with at least one embodiment. Some or all of the process 400 (or any other processes described, or variations and/or combinations of those processes) may be performed under the control of one or more computer systems, including executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 400 may be performed by any suitable system, such as a server in a data center, by various components of the environments 200 described in conjunction with FIG. 2 such as anomaly detection subsystem, by multiple computing devices in a distributed system of a computing resource service provider, or by a service provided by a computing resource service provider. The process 400 includes a series of operations which result in the detecting anomalous activity by at least determining a classification for messages obtained from computing resources as described above. For example, the process 400 includes obtaining log information from computing resources 402. As described above, the anomaly detection subsystem or other computer system such as a stream service may monitor computing resources such as routers, switches, and other network appliances for messages, log entries, and/or other information generated by the computing resources. Furthermore, the messages may be generated in accordance with a particular format and/or definition in response to operations and/or events associated with the computing resources.

In step 404, the anomaly detection subsystem or other computer system performing the process 400 filters the messages included in the log information. As described above, messages may be filtered based at least in part on information included in the message such as a severity level. A filter, in various embodiments, is used to filter messages to reduce a number of messages processed by the anomaly detection subsystem. In step 406, the anomaly detection subsystem or other computer system performing the process 400 parses the message included in the log information. As described above, the messages may be tokenized for use with the spatial cosine similarity algorithm. In yet other embodiments, the messages are parsed to generate a temporary message as described above.

In step 408, the anomaly detection subsystem or other computer system performing the process 400 performs a training phase to generate a virtual message 408. The training phase, in various embodiments, causes a global dictionary to be created based at least in part on tokens obtained from the messages as described above. Furthermore, a virtual message may be generated based at least in part on the global dictionary. The virtual message, in various embodiments, contains a portion of the tokens included in the global dictionary based at least in part on the frequency of the tokens. In one example, the virtual message includes the most frequent tokens as defined by:

$$f_m \leq k_1 * \max(f_1) = 0.05$$

where $k_1$ is determined based at least in part on the distribution of the tokens in the global dictionary. In step 410, the anomaly detection subsystem or other computer system performing the process 400 performs a detection phase using the virtual message. As described above, during the detection phase, the anomaly detection subsystem compares temporary messages to the virtual message using the spatial cosine similarity algorithm to determine a classification of a particular message associated with the temporary message. In one example, if the temporary message is dissimilar to the virtual message as indicated by the spatial cosine similarity value the message used to generate the temporary message is classified as rare.

In step 412, the anomaly detection subsystem or other computer system performing the process 400 provides the classified messages. As described above, the classified messages may be provided to a variety of endpoints such as a system engineer, machine learning algorithm, or other endpoint suitable for use in detecting anomalies in a distributed computing system. Note some or all of the steps of process 400 may be performed in various orders such as parallel. For example, the process 400 may be executed continuously and as such the system executing the process 400 may be processing messages in a pipeline. In other variations of the process 400, various steps may be omitted and/or performed on parallel.

Figure 5:
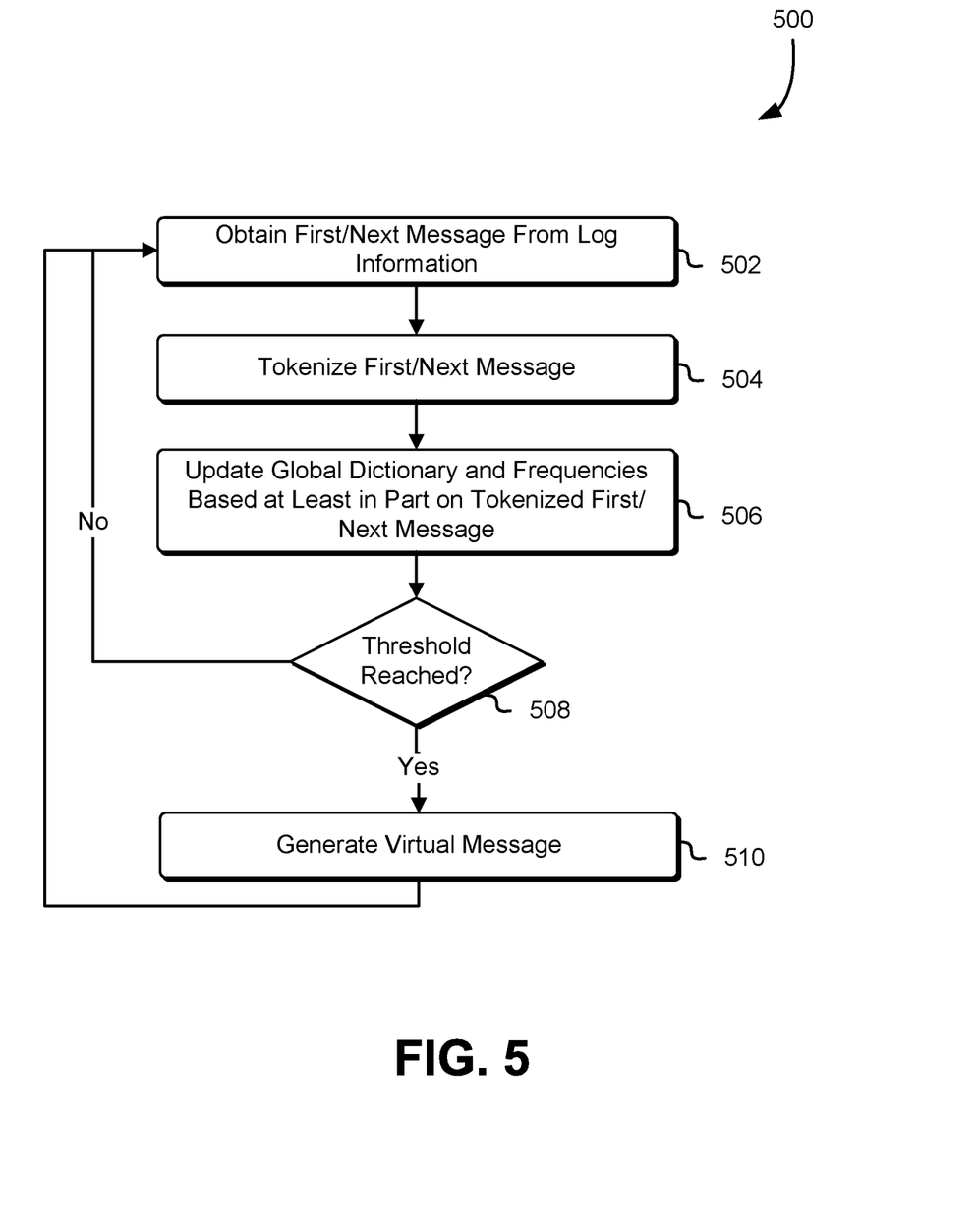
FIG. 5 shows an illustrative process which may be used to execute a training phase in accordance with an embodiment.

FIG. 5 is a block diagram illustrating an example of a process 500 for executing a training phase in accordance with at least one embodiment. Some or all of the process 500 (or any other processes described, or variations and/or combinations of those processes) may be performed under the control of one or more computer systems including executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 500 may be performed by any suitable system, such as a server in a data center, by various components of the environments 200 described in conjunction with FIG. 2 such as anomaly detection subsystem, by multiple computing devices in a distributed system of a computing resource service provider, or by a service provided by a computing resource service provider. The process 500 includes a series of operations which result in the anomaly detection subsystem generating a global dictionary and virtual message as described above. For example, the process 500 includes obtaining a first/next message from log information obtained from computing resources 502. As described above, the training phase may consist of processing a number of messages to generate a virtual message.

In step 504, the anomaly detection subsystem or other computer system performing the process 500 tokenizes the first/next message. Tokenizing the message may include parsing the message to remove numbers, stop word, punctuation, or any other extraneous information, so as to reduce the entropy attributable to the messages. In step 506, the anomaly detection subsystem or other computer system performing the process 500 updates the global dictionary and frequency information based at least in part on the tokens included in the message. In one example, if a particular token has not previously been included in the global dictionary the anomaly detection subsystem or other computer system performing the process 500 adds the particular token to the global dictionary with a frequency of one. In another example, if particular token is already included in the global dictionary the anomaly detection subsystem or other computer system performing the process 500 increments the frequency corresponding to the particular token by one.

In step 508, the anomaly detection subsystem or other computer system performing the process 500 determines in a number of messages evaluated by the anomaly detection subsystem or other computer system performing the process 500 is within a threshold value. For example, if the training phase is to last 50,000 messages, the anomaly detection subsystem or other computer system performing the process 500 determines if 50,000 messages have been processed. If the threshold has not been reached the anomaly detection subsystem or other computer system performing the process 500 returns to step 502 and continues to process messages. However, if the threshold has been reached the anomaly detection subsystem or other computer system performing the process 500 continues to step 510.

In step 510, the anomaly detection subsystem or other computer system performing the process 500 generates a virtual message. The virtual message may include a number of tokens based at least in part on the most frequent tokens included in the global dictionary as described above. Note some or all of the steps of process 500 may be performed in various orders such as parallel. For example, the process 500 may process a plurality of messages in parallel. In other variations of the process 500, various steps may be omitted.

Figure 6:
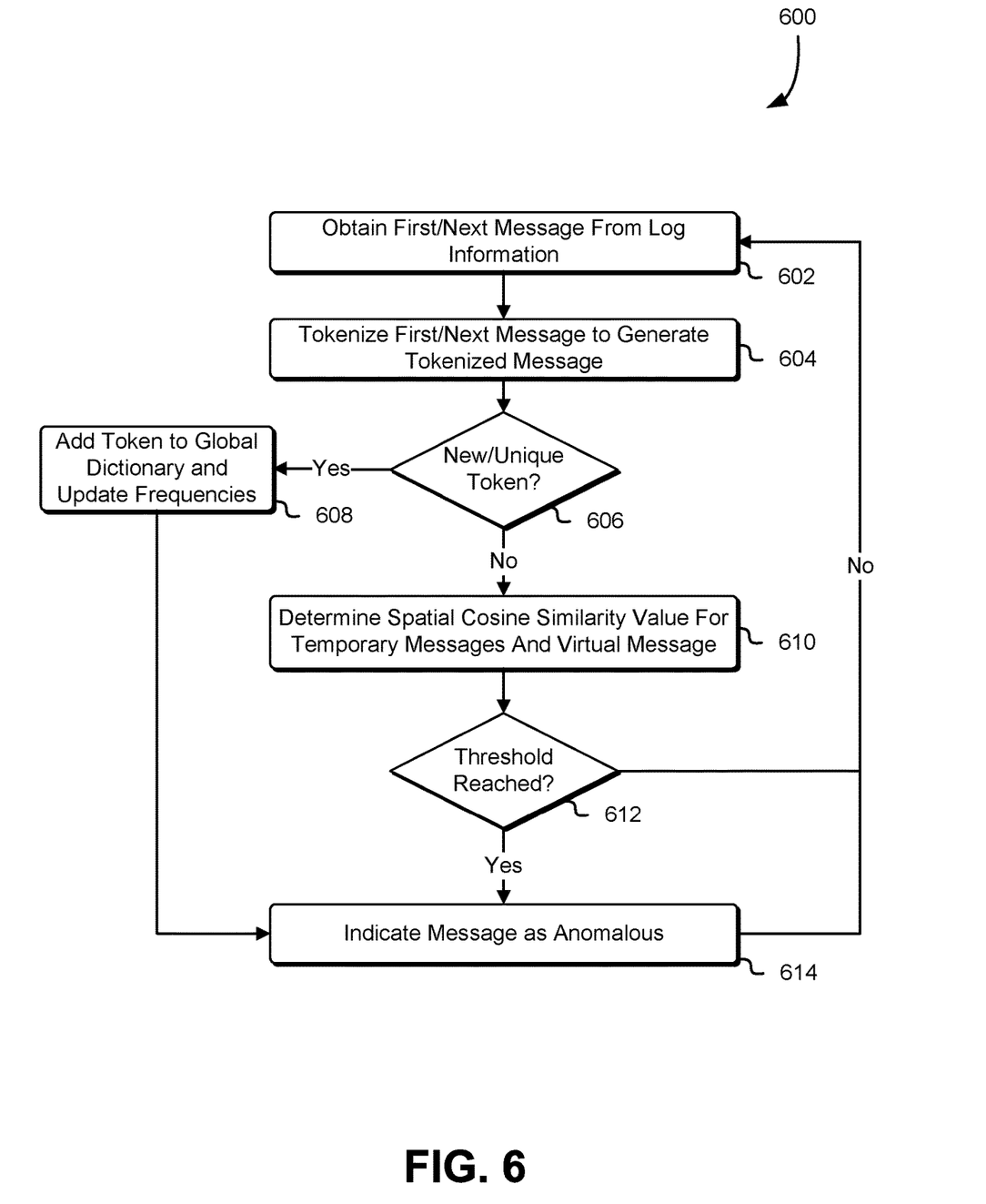
FIG. 6 shows an illustrative process which may be used to execute a detection phase in accordance with an embodiment.

FIG. 6 is a block diagram illustrating an example of a process 600 for performing a detection and update phase in accordance with at least one embodiment. Some or all of the process 600 (or any other processes described, or variations and/or combinations of those processes) may be performed under the control of one or more computer systems including executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environments 200 described in conjunction with FIG. 2 such as anomaly detection subsystem, by multiple computing devices in a distributed system of a computing resource service provider, or by a service provided by a computing resource service provider. The process 600 includes a series of operations which result in detecting anomalous activity by at least determining a classification for messages obtained from computing resources as described above. For example, the process 600 includes obtaining a first/next message from log information obtained from computing resources 602.

In step 604, the anomaly detection subsystem or other computer system performing the process 600 tokenizes the first/next message to generate a temporary message as described above. Tokenizing the message may include parsing the message to remove numbers, stop word, punctuation, or any other extraneous information, so as to reduce the entropy attributable to the messages. In step 606, the anomaly detection subsystem or other computer system performing the process 600 determines if the temporary message includes one or more new tokens. As described above, a new token includes any token not previously included in the global dictionary. If the message includes a new token, the anomaly detection subsystem or other computer system performing the process 600 proceeds to step 608 and adds the new token to the global dictionary. Then in step 614, the anomaly detection subsystem or other computer system performing the process 600 indicates the message as anomalous. Returning to step 606, if the anomaly detection subsystem or other computer system performing the process 600 determines the temporary message does not contain any new tokens the process continues to step 610.

In step 610, the anomaly detection subsystem or other computer system performing the process 600 determines the spatial cosine similarity value for the temporary message and the virtual message. The spatial cosine similarity may be determined as described above in connection with FIG. 2. In step 612, the anomaly detection subsystem or other computer system performing the process 600 determines if the spatial cosine similarity value is within a value of a threshold. As described above, the anomaly detection subsystem or other computer system performing the process 600 may set a threshold for the spatial cosine similarity value indicating a similarity below which the temporary message and the virtual message are considered sufficiently dissimilar to indicate the message is anomalous.

If the spatial cosine similarity value has not reached the threshold, the anomaly detection subsystem or other computer system performing the process 600 discards or ignores the message and returns to step 602 and continues the process 600. If the threshold is reached, the anomaly detection subsystem or other computer system performing the process 600 continues to step 614. In step 614, the anomaly detection subsystem or other computer system performing the process 600 indicates the message is anomalous. In one example, the message in classified as anomalous and stored in a storage location accessible to a user. Note some or all of the steps of process 600 may be performed in various orders such as parallel. For example, the process 600 may be executed continuously and as such the system executing the process 600 may be detecting anomalous activity in messages contemporaneously or near contemporaneously as they are generated by the computing resources. In other variations of the process 600, various steps may be omitted.

Figure 7:
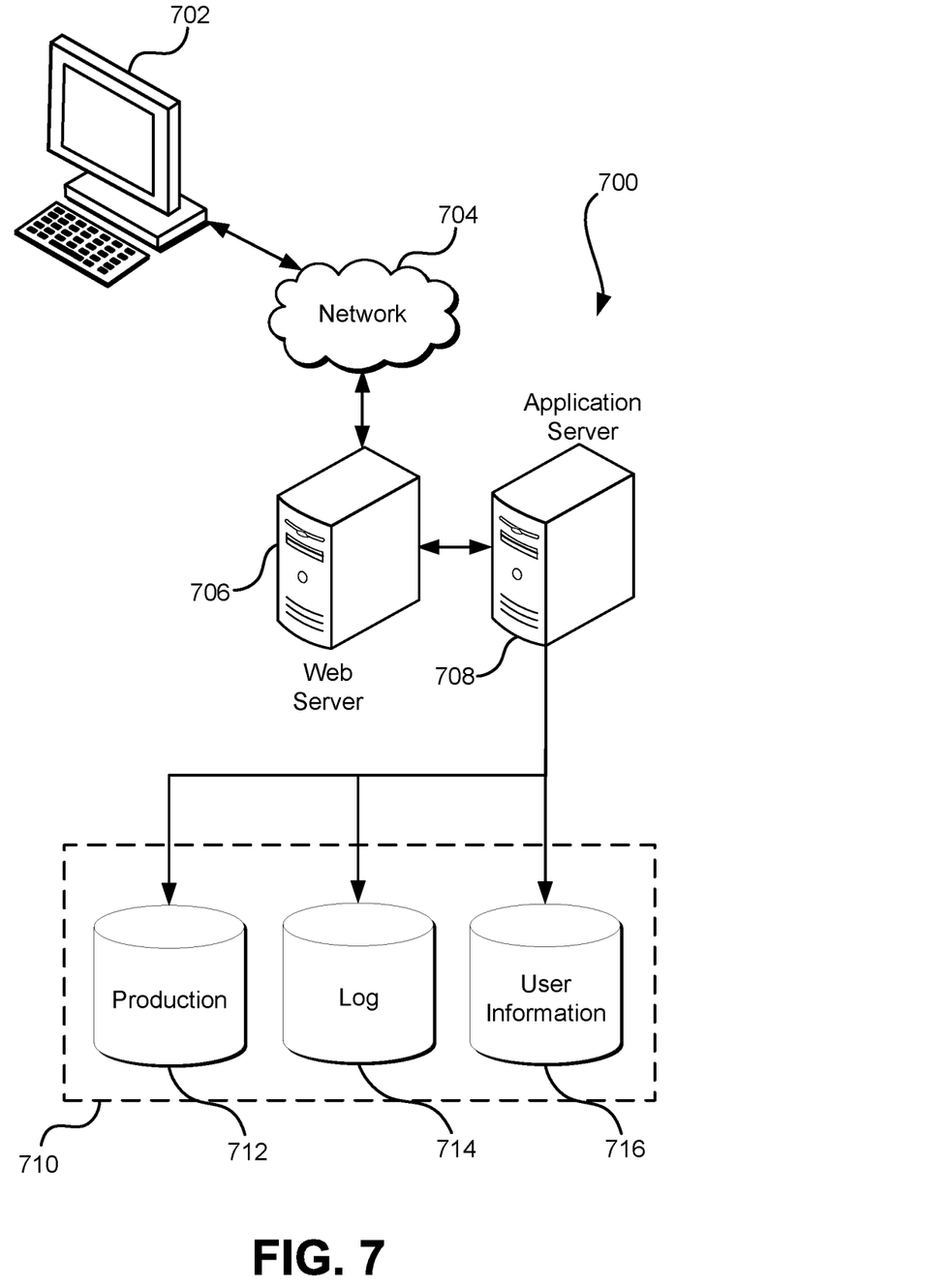
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server 708, in an embodiment, is handled by the web server using PHP:

Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto and the application server 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. A computer-implemented method, comprising:
    obtaining an initial set of messages generated by a set of devices in a computer network that detects anomalous messages;
    processing the initial set of messages by discarding a portion of the initial set to generate a first set of messages from a remainder of the initial set;
    generating a virtual message by:
        generating a dictionary including a set of tokens and corresponding frequencies for tokens included in the first set of messages;
        determining a subset of the set of tokens to include in the virtual message based on frequencies associated with tokens of the subset; and
        causing the virtual message to include the subset of the set of tokens;
    obtaining a second message generated by the set of devices;
    classifying the second message by:
        determining a spatial cosine similarity between the second message and the virtual message; and
        determining a classification of the second message based on a result of the spatial cosine similarity between the second message and the virtual message; and
    providing the classification of the second message.

2. The computer-implemented method of claim 1, wherein obtaining the first set of messages comprises filtering a different set of messages based at least in part on information included in the different set of messages.

3. The computer-implemented method of claim 1, further comprising generating a temporary message by at least determining a second set of tokens associated with the second message; and
    wherein determining the spatial cosine similarity comprises determining the spatial cosine similarity between the virtual message and the temporary message.

4. The computer-implemented method of claim 3, further comprising:
    generating a determination that one token of the second set of tokens is not included in the dictionary; and
    wherein the second message is classified based on the determination.

5. A system, comprising:
    one or more processors; and memory that stores computer-executable instructions that, as a result of being executed, cause the one or more processors to:
obtain a message associated with an event of a computing resource;
generate a virtual message to include a subset of tokens from a set of tokens obtained from the message based on frequencies associated with the subset of tokens;
determine a spatial cosine similarity between the message and the virtual message;
determine that a value of the spatial cosine similarity between the message and the virtual message is within a threshold; and
provide an indication of the message to an anomaly detection service.

6. The system of claim 5, wherein the memory further stores computer-executable instructions that, as a result of being executed, cause the system to:
execute a training phase by:
generating a dictionary including a set of tokens obtained from a set of messages, the dictionary indicating a frequency of at least a portion of the set of tokens included in the set of messages; and
generating virtual messages based on a subset of tokens of the set of tokens and frequencies associated with the subset of tokens.

7. The system of claim 6, wherein the training phase is performed until a number of messages is reached.

8. The system of claim 6, wherein the memory further stores computer-executable instructions that, as a result of being executed, cause the system to determine a number of messages have been provided to the anomaly detection service and, as a result, re-execute the training phase.

9. The system of claim 8, wherein the subset of tokens of the virtual message is modified based on a result of re-executing the training phase.

10. The system of claim 5, wherein the memory further stores computer-executable instructions that, as a result of being executed, cause the system to:
obtain a second message associated with the computing resource; and
discard the second message based on a severity level indicated in the second message.

11. The system of claim 5, wherein the computing resource is a network appliance.

12. The system of claim 5, wherein the memory further stores computer-executable instructions that, as a result of being executed, cause the system to parse the message to generate the set of tokens used to determine the value of the spatial cosine similarity.

13. A non-transitory computer-readable storage medium having stored thereon executable instructions that, as a result of being executed by one or more processors of a computer system, cause the computer system to at least:
obtain a message generated by a computing resource that detects anomalies in the message;
determine a classification of the message by:
determining a spatial cosine similarity between the message and a virtual message representing other messages generated by the computing resource, wherein the virtual message comprises a subset of a set of tokens obtained from the message and wherein the subset is determined based on frequencies associated with the subset; and
assigning the classification to the message based on a result of the spatial cosine similarity between the message and the virtual message; and
provide the classification of the message.

14. The non-transitory computer-readable storage medium of claim 13, wherein the instructions further comprise instructions that, as a result of being executed by the one or more processors, cause the computer system to parse the message to generate a set of tokens representing content of the message.

15. The non-transitory computer-readable storage medium of claim 13, wherein the instructions further comprise instructions that, as a result of being executed by the one or more processors, cause the computer system to:
generate a dictionary indicating frequencies associated with a set of tokens obtained from a set of messages.

16. The non-transitory computer-readable storage medium of claim 15, wherein the instructions further comprise instructions that, as a result of being executed by the one or more processors, cause the computer system to execute a training phase based on a number of messages having been classified.

17. The non-transitory computer-readable storage medium of claim 15, wherein the instructions further comprise instructions that, as a result of being executed by the one or more processors, cause the computer system to determine a number of tokens to include in the subset of tokens based on a threshold associated with a distribution of the subset.

18. The non-transitory computer-readable storage medium of claim 13, wherein the message generated by the computing resource is generated based on a format unique to the computing relative to other computing resources of a different type.

19. The non-transitory computer-readable storage medium of claim 13, wherein the instructions that cause the computer system to obtain the message generated by a computing resource further cause the computer system to determine that the message includes a severity level within a value relative to a threshold for determining the classification of the message.

20. The non-transitory computer-readable storage medium of claim 13, wherein the message includes information obtained by monitoring a system log of the computing resource.

* * * * *